US012726681B2

(12) United States Patent
Li

(10) Patent No.: US 12,726,681 B2
(45) Date of Patent: Sep. 1, 2026

(54) MEDIA CONTENT GENERATION METHOD AND APPARATUS, DEVICE, AND STORAGE MEDIUM

(71) Applicant: Beijing Zitiao Network Technology Co., Ltd., Beijing (CN)

(72) Inventor: Zhaoying Li, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/863,929

(22) PCT Filed: May 17, 2023

(86) PCT No.: PCT/CN2023/094728
§ 371 (c)(1),
(2) Date: Nov. 7, 2024

(87) PCT Pub. No.: WO2023/226846
PCT Pub. Date: Nov. 30, 2023

(65) Prior Publication Data

US 2025/0310609 A1 Oct. 2, 2025

(30) Foreign Application Priority Data

May 27, 2022 (CN) ........................ 202210594694.0

(51) Int. Cl.

| | |
|---|---|
| *H04N 21/472* | (2011.01) |
| *H04N 21/2187* | (2011.01) |
| *H04N 21/4722* | (2011.01) |

(52) U.S. Cl.
CPC ..... *H04N 21/4722* (2013.01); *H04N 21/2187* (2013.01); *H04N 21/47205* (2013.01)

(58) Field of Classification Search
CPC ........... H04N 21/4722; H04N 21/2187; H04N 21/47205; H04N 21/4788; H04N 21/431
See application file for complete search history.

(56) References Cited

U.S. PATENT DOCUMENTS

| | | | | |
|---|---|---|---|---|
| 11,716,512 | B2 * | 8/2023 | Brehm | H04N 21/42209 725/39 |
| 12,375,744 | B2 * | 7/2025 | Correa | H04N 21/25891 |
| 2024/0346567 | A1 * | 10/2024 | Liu | G06Q 30/0641 |

FOREIGN PATENT DOCUMENTS

| | | |
|---|---|---|
| CN | 106776537 A | 5/2017 |
| CN | 106815183 A | 6/2017 |

(Continued)

OTHER PUBLICATIONS

International Search Report for PCT/CN2023/094728, mailed on Aug. 22, 2023, 7 pages.

(Continued)

*Primary Examiner* — Alazar Tilahun
(74) *Attorney, Agent, or Firm* — Astute IP Law Group

(57) ABSTRACT

Embodiments of the present disclosure disclose a media content generation method and apparatus, a device, and a storage medium. The method includes: obtaining initial text information input by a first user for a target live streaming channel; obtaining information associated with a target live streaming event in the target live streaming channel based on the initial text information; and generating target media content based on the information associated with the target live streaming event in response to a preset operation of the first user, where the target media content includes at least one of image content and video content related to the information associated with the target live streaming event.

18 Claims, 5 Drawing Sheets

(56) References Cited

FOREIGN PATENT DOCUMENTS

| | | | |
|---|---|---|---|
| CN | 108600864 | A | 9/2018 |
| CN | 109151604 | A | 1/2019 |
| CN | 109783798 | A | 5/2019 |
| CN | 110517689 | A | 11/2019 |
| CN | 112468866 | A | 3/2021 |
| CN | 112579826 | A | 3/2021 |
| CN | 113015012 | A | 6/2021 |
| CN | 113038152 | A | 6/2021 |
| CN | 113438496 | A | 9/2021 |
| CN | 113821690 | A | 12/2021 |
| CN | 113869042 | A | 12/2021 |
| CN | 113992928 | A | 1/2022 |
| CN | 113992935 | A | 1/2022 |
| CN | 114025184 | A | 2/2022 |
| CN | 114500437 | A | 5/2022 |
| CN | 114900711 | A | 8/2022 |
| WO | 2022041731 | A1 | 3/2022 |

OTHER PUBLICATIONS

Search Report received for Chinese Patent Application No. 202210594694.0, mailed on Jul. 6, 2023, 2 pages.
Supplementary Search report received for Chinese Patent Application No. 202210594694.0, mailed on Nov. 30, 2023, 2 pages.
Extended European Search Report received for European Patent Application No. 23810919.3, mailed on Apr. 28, 2026, 9 pages.

* cited by examiner

MEDIA CONTENT GENERATION METHOD AND APPARATUS, DEVICE, AND STORAGE MEDIUM

CROSS-REFERENCE TO RELATED APPLICATIONS

The present application is a U.S. National Stage Application of PCT International Application No. PCT/CN2023/094728, filed on May 17, 2023, which claims priority to Chinese Patent Application No. 202210594694.0, filed with the China National Intellectual Property Administration on May 27, 2022, the contents of which are incorporated herein by reference in their entireties.

FIELD

Embodiments of the present disclosure relate to the field of live streaming technologies, and for example, to a media content generation method and apparatus, a device, and a storage medium.

BACKGROUND

With rapid development of information technologies and popularization of the mobile Internet, applications have increasingly rich functions, and many applications may have a live streaming function.

SUMMARY

Embodiments of the present disclosure provide a media content generation method and apparatus, a storage medium, and a device.

An embodiment of the present disclosure provides a media content generation method. The method includes:

obtaining initial text information input by a first user for a target live streaming channel;

obtaining information associated with a target live streaming event in the target live streaming channel based on the initial text information; and generating target media content based on the information associated with the target live streaming event in response to a preset operation of the first user, where the target media content includes at least one of image content and video content related to the information associated with the target live streaming event.

An embodiment of the present disclosure further provides a media content generation apparatus. The apparatus includes:

a text information obtaining module configured to obtain initial text information input by a first user for a target live streaming channel;

an associated-information obtaining module configured to obtain information associated with a target live streaming event in the target live streaming channel based on the initial text information; and a media content generation module configured to generate target media content based on the information associated with the target live streaming event in response to a preset operation of the first user, where the target media content includes at least one of image content and video content related to the information associated with the target live streaming event.

An embodiment of the present disclosure further provides an electronic device. The electronic device includes:

one or more processors; and a storage apparatus configured to store one or more programs, where the one or more programs, when executed by the one or more processors, cause the one or more processors to implement the media content generation method according to the embodiment of the present disclosure.

An embodiment of the present disclosure further provides a storage medium including computer-executable instructions, where the computer-executable instructions, when executed by a computer processor, are used to perform the media content generation method according to the embodiment of the present disclosure.

DETAILED DESCRIPTION OF EMBODIMENTS

Figure 1:
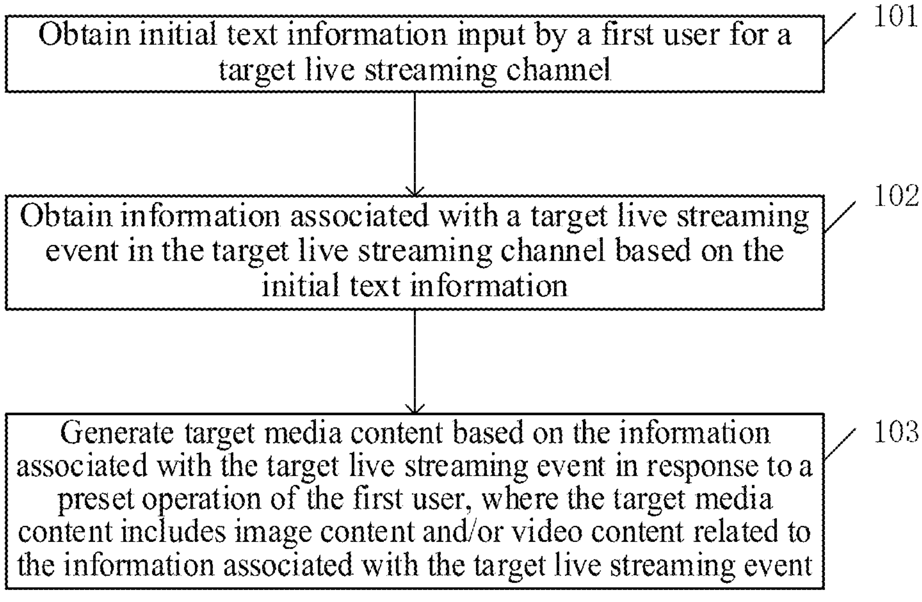
FIG. 1 is a schematic flowchart of a media content generation method according to an embodiment of the present disclosure.

The embodiments of the present disclosure are described below with reference to the accompanying drawings. The accompanying drawings and the embodiments of the present disclosure are only for exemplary purposes, and are not intended to limit the scope of protection of the present disclosure.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

It can be understood that before the use of the plurality of technical solutions disclosed in the embodiments of the present disclosure, the user shall be informed of the type, range of use, use scenarios, etc., of personal information involved in the present disclosure in an appropriate manner in accordance with the relevant laws and regulations, and the authorization of the user shall be obtained.

For example, in response to reception of an active request from a user, prompt information is sent to the user to clearly inform the user that a requested operation will require access to and use of personal information of the user. As such, the user can independently choose, based on the prompt information, whether to provide the personal information to software or hardware, such as an electronic device, an application, a server, or a storage medium, that performs the operations of the technical solutions of the present disclosure.

As an optional but non-limiting implementation, in response to the reception of the active request from the user, the prompt information may be sent to the user in the form of, for example, a pop-up window, in which the prompt information may be presented in text. Furthermore, the pop-up window may also include a selection control for the user to choose whether to "agree" or "disagree" to provide the personal information to the electronic device.

It can be understood that the above process of notifying and obtaining user authorization is only illustrative and does not constitute a limitation on the implementations of the present disclosure, and other manners that satisfy the relevant laws and regulations may also be applied in the implementations of the present disclosure.

It can be understood that the data involved in the technical solutions (including, but not limited to, the data itself and the access to or use of the data) shall comply with the requirements of corresponding laws, regulations, and relevant provisions.

In the related art, a viewer may watch live streaming content of their interest through a live streaming channel. The live streaming content in the live streaming channel usually varies over time. In order to facilitate the viewer in learning information related to the live streaming content in advance, a streamer may edit a text announcement including the above related information in advance, and then publish the text announcement on a page related to a streamer account, such as a personal homepage of the streamer account. As such, the viewer can learn the information related to the live streaming content by viewing the personal homepage of the streamer account.

FIG. 1 is a schematic flowchart of a media content generation method according to an embodiment of the present disclosure. The embodiment of the present disclosure is applicable to the situation of publishing information associated with a target live streaming event. The method may be performed by a media content generation apparatus. The apparatus may be implemented in the form of software and/or hardware, and optionally implemented by an electronic device. The electronic device may be a mobile terminal such as a cell phone, a smart watch, a tablet computer, or a personal digital assistant, or may be a device such as a personal computer (PC) terminal or a server.

As shown in FIG. 1, the method includes the following steps.

Step 101: Obtain initial text information input by a first user for a target live streaming channel.

In this embodiment of the present disclosure, the target live streaming channel may be a live streaming channel in a preset application, and the preset application may be understood as an application capable of providing a live streaming function. The specific type of the preset application is not limited, and the preset application may be installed in the electronic device. Optionally, the electronic device configured to perform the media content generation method may be a client device configured to be provided with the preset application, or may be a server device configured to correspond to the preset application. The first user may include a user that can use a streamer account in the preset application (i.e., a user to whom the target live streaming channel belongs) or a moderator. The first user can use the streamer account to perform a live stream in the target live streaming channel, and/or the first user can also manage the streamer account, etc. The target live streaming channel may be understood as a live streaming channel to which the first user has a management permission.

For example, the preset application may include a setup page of the target live streaming channel, and a location of an entry to the setup page is not limited. For example, the entry may be at a personal homepage of a streamer, or may be on a group chat dialog page corresponding to the streamer, etc., where a group chat dialog may include a dialog in which the streamer and a viewer jointly participate.

For example, before starting the live stream, the streamer may formulate a live streaming start plan. The live streaming start plan may include, for example, information related to a live streaming event (which may be denoted as the target live streaming event) to be performed. For example, the related information may include information such as a live streaming topic and a live streaming time. In order to facilitate the viewer in learning the related information in advance, the first user may edit a character live streaming announcement on the setup page of the target live streaming channel according to the live streaming start plan, and the initial text information may be understood as text content in the text live streaming announcement.

Step 102: Obtain information associated with a target live streaming event in the target live streaming channel based on the initial text information.

Optionally, the information associated with the target live streaming event includes target live streaming topic information and/or target live streaming time information of the target live streaming event. Optionally, the information associated with the target live streaming event may further include a live streaming object associated with the target live streaming event (such as an item recommended during the live stream), live streaming time point information of the live streaming object (such as an expected time of an introduction to each recommended item), an introduction to a person participating in the live stream, etc.

Optionally, structured information may be extracted from the initial text information, and is used as the information associated with the target live streaming event. For example, a structured information type corresponding to the structured information to be extracted may be preset, and the corresponding structured information may then be extracted from the initial text information based on the structured information type. The structured information type may include, for example, a text introduction to the live streaming topic and a live streaming start time. The corresponding structured information may be extracted from the initial text information by using techniques such as natural language processing and keyword positioning, or the corresponding structured information may be determined through a location where the initial text information is input. For example, a first input location corresponding to the live streaming start time and a second input location corresponding to announcement content are respectively set on the setup page. Structured information corresponding to the live streaming start time is obtained from the first input location, and structured information corresponding to the live streaming topic is obtained from the second input location.

Step 103: Generate target media content based on the information associated with the target live streaming event in response to a preset operation of the first user, where the target media content includes image content and/or video content related to the information associated with the target live streaming event.

In this embodiment of the present disclosure, after the information associated with the target live streaming event is obtained, the target media content may be automatically generated based on the information associated with the target live streaming event upon reception of the preset operation of the first user, where the target media content includes the image content and/or video content related to the information associated with the target live streaming event. The preset operation may be understood as an operation for triggering the generation of the target media content, such as an operation for triggering generation of a button for the target media content.

For example, the target media content may contain all or part of the information associated with the target live streaming event, may contain information obtained by converting the information associated with the target live streaming event, or may contain content other than the information associated with the target live streaming event.

Optionally, the target media content includes at least one piece of the following: information associated with a user to whom the target live streaming channel belongs; target live streaming topic information contained in the information associated with the target live streaming event; target live streaming time information contained in the information associated with the target live streaming event; a background image associated with the target live streaming event and/or the user to whom the target live streaming channel belongs; audio associated with the target live streaming event and/or the user to whom the target live streaming channel belongs; and a preset control, where the preset control is used for a second user to trigger an interaction operation associated with a target object, and the target object includes at least one of the target live streaming event, the target live streaming channel, and the user to whom the target live streaming channel belongs.

The information associated with the user to whom the target live streaming channel belongs may include user identification information, such as an account name or a user avatar, of the user to whom the target live streaming channel belongs. The target live streaming topic information contained in the information associated with the target live streaming event and/or the target live streaming time information contained in the information associated with the target live streaming event may be present, in the form of text, in the target media content, where text attribute information, such as a font or a font size, is variable. The background image associated with the target live streaming event may be a background image that is recommended through an automatic match after analysis of the information associated with the target live streaming event, such as the target live streaming topic information. The background image associated with the user to whom the target live streaming channel belongs may be a background image that has ever been set by default by the user to whom the target live streaming channel belongs, or may be a background image that is automatically generated based on the information associated with the user to whom the target live streaming channel belongs. For example, a target color is determined after picking a color from the user avatar of the user to whom the target live streaming channel belongs, and a single-color or gradient-color background image, etc. is then generated based on the target color. The audio associated with the target live streaming event may include, for example, audio information obtained by converting the information associated with the target live streaming event, or may include other audio content, such as background music, that is recommended through an automatic match after analysis of the information associated with the target live streaming event, such as the target live streaming topic information. The audio associated with the user to whom the target live streaming channel belongs may include audio that has ever been set by default by the user to whom the target live streaming channel belongs. The preset control is used for the second user (which may include the viewer) to trigger the interaction operation associated with the target object. When the target object includes the target live streaming event, the interaction operation may include booking the target live streaming event, in which case the preset control may include a button named by text such as "Book", or may include the target live streaming time information, etc. When the target object includes the target live streaming channel, the interaction operation may include, for example, following the target live streaming channel, making a comment in the target live streaming channel, etc. When the target object includes the user to whom the target live streaming channel belongs, the interaction operation may include, for example, following the user to whom the target live streaming channel belongs, sending a private message to the user to whom the target live streaming channel belongs, etc.

For example, after the target media content is generated, the generated target media content is richer than the initial text information, allowing the second user to watch more vivid and rich content of a live streaming preview.

In the media content generation method of this embodiment of the present disclosure, the initial text information input by the first user for the target live streaming channel is obtained, the information associated with the target live streaming event in the target live streaming channel is obtained based on the initial text information, and the target media content is generated based on the information associated with the target live streaming event in response to the preset operation of the first user, where the target media content includes the image content and/or the video content related to the information associated with the target live streaming event. With the above technical solution, the first user can input information related to the live streaming event in the target live streaming channel in the form of text, and is automatically assisted in generating the target media content corresponding to the initial text information, reducing operations to be performed by the first user, enriching forms of the live streaming preview, and ensuring efficiency of generating the live streaming preview.

In some embodiments, the obtaining information associated with a target live streaming event in the target live streaming channel based on the initial text information includes: determining initial time information based on the initial text information; if the initial time information includes one piece of live streaming time information, determining the live streaming time information as the target live streaming time information of the target live streaming event in the target live streaming channel; and if the initial time information includes a plurality of pieces of live streaming time information, determining, as the target live streaming time information, live streaming time information in the plurality of pieces of live streaming time information that satisfies a preset condition.

For example, when inputting the initial text information, the first user may input a live streaming time according to a live streaming mode in the target live streaming channel, where the live streaming mode may include a periodic live streaming mode and a single-show live streaming mode. For example, in the periodic live streaming mode, a live stream may be started in the target live streaming channel at a fixed time in one or several days designated in each week, for example, a live stream is started at 20:00 on Monday, Wednesday, and Friday in each week. In the single-show live streaming mode, a live streaming time may be freely set to any time. If the single-show live streaming mode is to be used, initial time information containing one piece of live streaming time information may be determined based on the initial text information, and the live streaming time information may then be determined as the target live streaming time information. If the periodic live streaming mode is to be used, initial time information containing a plurality of pieces of live streaming time information may be determined based on the initial text information, such as 20:00 on Monday, 20:00 on Wednesday, and 20:00 on Friday in each week as described in the above example. The live streaming time information that satisfies the preset condition may be information of a future live streaming time closest to a current time. For example, if the current time is on Thursday, 20:00 on Friday of the current week may be determined as the target live streaming time information.

In some embodiments, the generating target media content based on the information associated with the target live streaming event in response to a preset operation of the first user includes: generating and publishing the target media content based on the information associated with the target live streaming event in response to a first publish operation input by the first user. An advantage of such configuration is that the effect of generating and publishing the target media content at the same time may be achieved by inputting the publish operation once.

The first publish operation may be triggering a first preset button, and copy information of the first preset button may be, for example, "Generate and publish a video", etc.

For example, the publish form, the publish location, etc. of the target media content are not limited. Optionally, the target media content is published on a page associated with the streamer in the preset application, and the associated page may include, for example, the personal homepage, or may include the group chat dialog page. Optionally, the preset application may further provide a work publish function, whereby the target media content can be published as a work of the streamer.

In some embodiments, the generating target media content based on the information associated with the target live streaming event in response to a preset operation of the first user includes: generating the target media content based on the information associated with the target live streaming event in response to a generation operation input by the first user; and publishing the target media content in response to a second publish operation of the first user for the target media content. An advantage of such configuration is that the target media content is generated based on the generation operation of the user, and is published after the first user confirms the publish, so that before confirming the publish, the first user can preview the target media content to be published.

The generation operation may be triggering a second preset button, and copy information of the second preset button may be, for example, "Generate a video", etc. The second publish operation may be triggering a third preset button, and copy information of the third preset button may be, for example, "Publish the video", etc.

In some embodiments, the generating the target media content based on the information associated with the target live streaming event in response to a generation operation input by the first user includes: generating initial media content based on the information associated with the target live streaming event in response to a first generation operation of the first user; and generating the initial media content as the target media content. An advantage of such configuration is that the initial media content may be generated based on the information associated with the target live streaming event, and then displayed for viewing by the first user, so that the first user can directly generate the initial media content as the target media content.

In some embodiments, the generating the target media content based on the information associated with the target live streaming event in response to a generation operation input by the first user includes: generating initial media content based on the information associated with the target live streaming event in response to a second generation operation of the first user; and editing the initial media content in response to an edit operation input by the first user for the initial media content, and generating the target media content based on an edit result. An advantage of such configuration is that the initial media content may be automatically generated based on the initial text information, and the first user is enabled to modify the initial media content, so that the target media content obtained after editing is more in line with requirements of the first user.

For example, the edit operation may include a secondary edit operation for the target live streaming topic information contained in the initial text information and/or the target live streaming time information contained in the initial text information, such as changing text content in the target live streaming topic information, or changing a target live streaming time. The edit operation may also include adjusting a display location of information associated with the first user, changing the background image, changing the audio, adjusting a display location of the preset control, etc. The edit operation may also include deleting part of the initial media content, such as deleting a user identification of the first user.

In some embodiments, the method may further include: adding the target media content to a target page in response to a publish operation input by the first user, where the target page is associated with a user to whom the target live streaming channel belongs, the target page is used for viewing by a second user, and the publish operation includes the first publish operation or the second publish operation. An advantage of such configuration is that the generated target media content may be added to the target page associated with the user to whom the target live streaming channel belongs, for viewing by the second user, so that the second user can view the target media content in more varied ways.

For example, an association relationship between the target page and the user to whom the target live streaming channel belongs is not limited. For example, the target page may be a personal homepage of the user to whom the target live streaming channel belongs, a group chat dialog page of a group chat dialog in which the user to whom the target live streaming channel belongs participates, a live streaming news page of the user to whom the target live streaming channel belongs, etc.

In some embodiments, the adding the target media content to a target page includes: adding the target media content to a list of works of the user to whom the target live streaming channel belongs. An advantage of such configuration is that the second user can view the target media content while browsing the list of works of the user to whom the target live streaming channel belongs.

In some embodiments, the generating target media content based on the information associated with the target live streaming event includes: filling a preset media template with the information associated with the target live streaming event, to obtain a filling result, and generating the target media content based on the filling result. An advantage of such configuration is that the target media content can be generated quickly by presetting the media template and filling the template with the information associated with the target live streaming event that is extracted from the initial text information input by the first user, thereby further increasing the efficiency of generating and publishing the live streaming preview.

Optionally, when the information associated with the target live streaming event is structured information, a structured information type corresponding to the preset media template may be preset, and targeted information extraction may be performed on the initial text information based on the structured information type corresponding to the preset media template.

In some embodiments, the generating initial media content based on the information associated with the target live streaming event includes: generating an editable element based on the information associated with the target live streaming event; and generating the initial media content based on the editable element. An advantage of such configuration is that the editable element containing the information associated with the target live streaming event may be presented in the initial media content, so that the first user can edit the initial media content based on the editable element.

In some embodiments, after the publishing the target media content, the method further includes: pushing the target media content to the second user through a server. For example, a push request may be sent to the server end, to instruct the server to push the target media content to the second user. An advantage of such configuration is that compared with the second user actively going to a page associated with the first user to view the target media content, actively pushing the target media content to the second user can increase the exposure rate of the target media content, further enhancing the effect of the live streaming preview.

For example, the timing of pushing the target media content to the second user is not limited, and as a new work published by the user to whom the target live streaming channel belongs, the target media content may be pushed to the second user in the form of a work. For example, the target media content is added to a work push queue for the second user.

Optionally, the pushing the target media content to the second user includes: pushing the target media content to a target second user, where the target second user has a preset association relationship with the user to whom the target live streaming channel belongs. An advantage of such configuration is that a more reasonable push condition is set for the pushing of the target media content. Optionally, the preset association relationship may be, for example, that the target second user has subscribed to the live streaming preview of the target live streaming channel, may be that the target second user has followed the user to whom the target live streaming channel belongs, may be that the target second user is a dialog member in the above group chat dialog, etc.

In some embodiments, the method further includes: adding the initial text information to the target page in response to the preset operation input by the first user. An advantage of such configuration is that after the first user inputs the preset operation, a text version of the live streaming announcement may be published at the same time as or during the generation of the target media content, ensuring that a function of publishing the text version of the live streaming announcement is not affected. It may be understood that when the first user performs an edit operation on the target media content to modify the information associated with the target live streaming event and contained in the initial text information, the initial text information may be modified accordingly and synchronized to the text version of the live streaming announcement displayed to the viewer.

In some embodiments, after the obtaining initial text information input by a user for a target live streaming channel, the method further includes: adding the initial text information to the target page in response to a second preset operation input by the first user. An advantage of such configuration is that a function of separately publishing the text version of the live streaming announcement is provided, allowing the first user to make a choice more freely.

Figure 2:
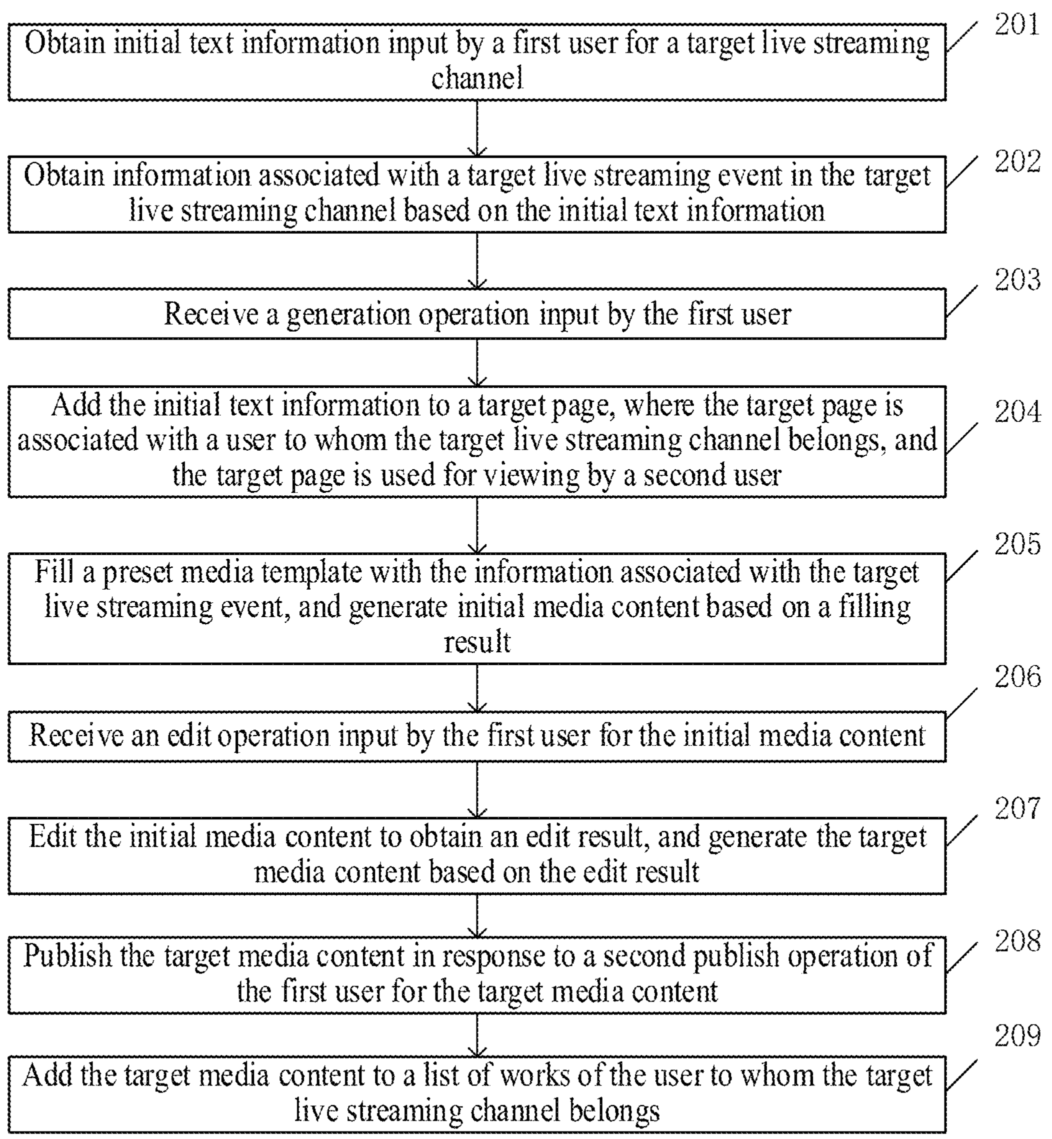
FIG. 2 is a schematic flowchart of another media content generation method according to an embodiment of the present disclosure.

FIG. 2 is a schematic flowchart of another media content generation method according to an embodiment of the present disclosure. This embodiment of the present disclosure is optimized based on a plurality of optional solutions in the above embodiment. The method includes the following steps.

Step 201: Obtain initial text information input by a first user for a target live streaming channel.

Figure 3:
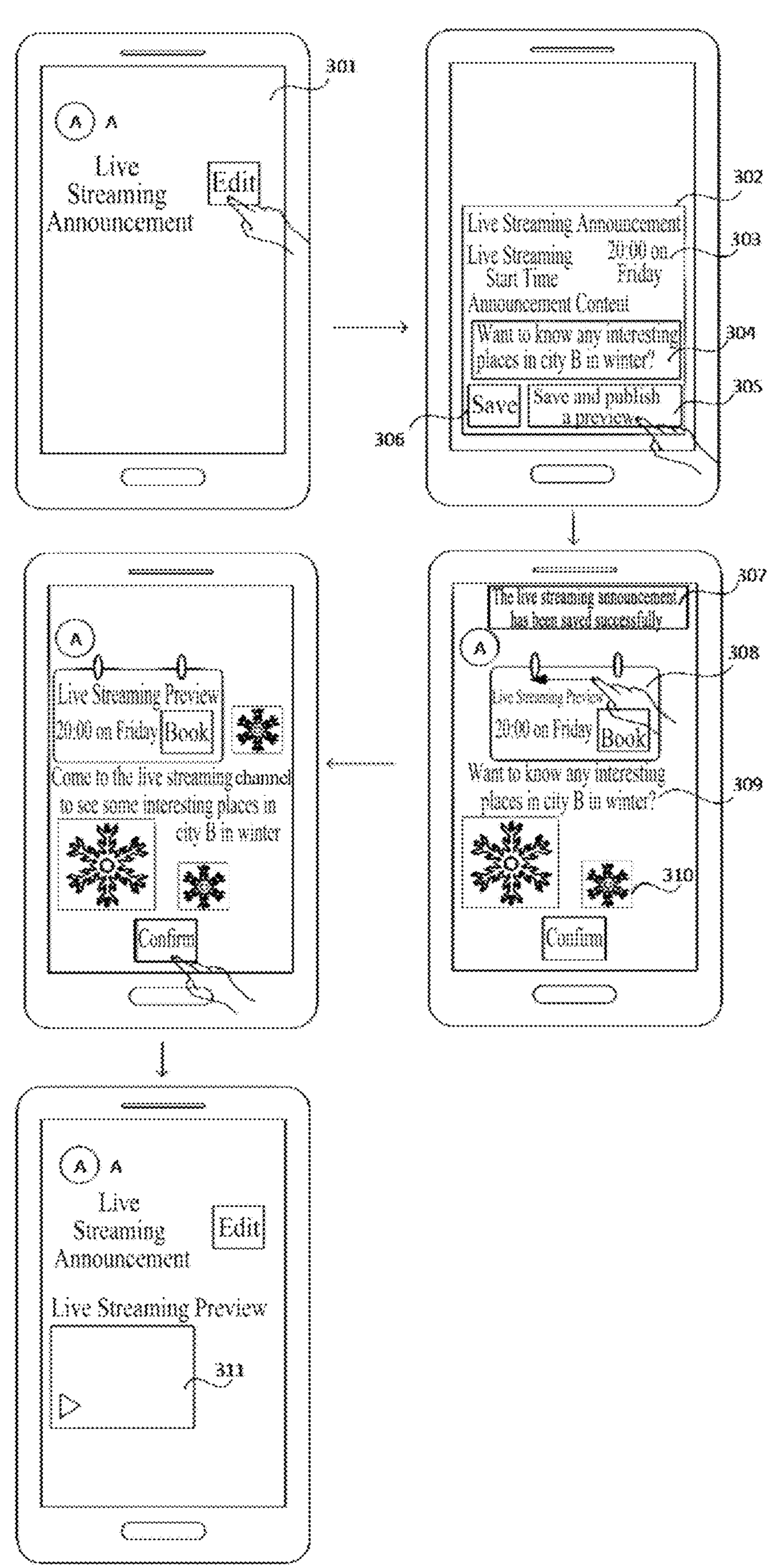
FIG. 3 is a schematic diagram of an interface interaction process according to an embodiment of the present disclosure.

FIG. 3 is a schematic diagram of an interface interaction process according to an embodiment of the present disclosure. For example, the first user may enter a live streaming news page 301 of the target live streaming channel in the preset application, and enter a setup page 302 for a live streaming announcement through a trigger entry (e.g., an edit button in the figure). The first user inputs a live streaming start time (target live streaming time information) 303 (20:00 on Friday) and live streaming topic information (target live streaming topic information) 304 (Want to know any interesting places in city B in winter?) for the target live streaming channel on the setup page 302. The live streaming start time 303 and the live streaming topic information 304 are considered as the initial text information input by the first user.

Step 202: Obtain information associated with a target live streaming event in the target live streaming channel based on the initial text information.

For example, the information associated with the target live streaming event includes the target live streaming topic information and/or the target live streaming time information of the target live streaming event.

Step 203: Receive a generation operation input by the first user.

For example, a first button 305 and a second button 306 may be provided on the setup page 302. When the first user triggers the first button 305, it may be assumed that the first user wants to synchronize saving of a live streaming announcement, and a live streaming preview (i.e., target media content) is generated. When the first user triggers the second button 306, it may be assumed that the first user only wants to save a live streaming announcement, and no live streaming preview is automatically generated.

Step 204: Add the initial text information to a target page, where the target page is associated with a user to whom the target live streaming channel belongs, and the target page is used for viewing by a second user.

For example, after the first user triggers the first button 305, the live streaming announcement is saved, that is, the initial text information is saved as the content of the live streaming announcement, and the content of the live streaming announcement is added to the target page, such as a personal homepage of the user to whom the target live streaming channel belongs, so that the second user can view the live streaming announcement by visiting the target page. After the first user triggers the first button 305, a jump is made to an edit page for the live streaming preview. In order to facilitate the first user in learning that the live streaming announcement has been saved, a save success notification 307 (which may be denoted as a first notification) may be displayed on the edit page.

Step 205: Fill a preset media template with the information associated with the target live streaming event, and generate initial media content based on a filling result.

For example, the preset media template may include a live streaming time preview control 308 (which may be in the form of an editable element, e.g., a sticker control) and a text display area 309. The preset media template is automatically filled with the extracted information associated with the target live streaming event, to generate the initial media content. In addition to the information associated with the target live streaming event being automatically filled into the preset media template, the initial media content may have content related to the information associated with the target live streaming event added thereto. For example, after semantic analysis is performed on the live streaming topic information 304 (Want to know any interesting places in city B in winter?), it is determined that the target live streaming event is related to winter, a background image 310 containing a snowflake pattern may be automatically determined and displayed on the edit page for the live streaming preview. Additionally, the live streaming time preview control 308 may include a preset control, such as a book button as shown, which is used to be triggered by the second user to book the target live streaming event. In addition, the initial media content may further contain songs related to winter or a trip, etc.

Step 206: Receive an edit operation input by the first user for the initial media content.

For example, when the initial media content is displayed on the edit page for the live streaming preview, it may be assumed as an initial effect of the live streaming preview. If the first user is not satisfied with the automatically generated initial media content, they may also edit the initial media content according to their own will. For example, as shown in FIG. 3, a display location of the live streaming time preview control 308 may be changed by means of dragging the live streaming time preview control 308. For another example, the live streaming topic information may be modified, e.g., modified into "Come to the live streaming channel to see some interesting places in city B in winter". For yet another example, the live streaming time, etc. may also be modified.

Step 207: Edit the initial media content to obtain an edit result, and generate the target media content based on the edit result.

For example, the initial media content is edited based on the edit operation input by the first user, and an edit effect may be displayed in real time on the edit page for the live streaming preview for viewing by the first user.

Step 208: Publish the target media content in response to a second publish operation of the first user for the target media content.

For example, when the first user considers that media content is ready to be published, they may publish, as the target media content, the media content currently displayed on the edit page for the live streaming preview. For example, the publish of the target media content is triggered by triggering a confirm button in the figure (i.e., the second publish operation for the target media content).

For example, after the target media content is published, a jump may be made back to the live streaming news page, and a view entry 311 for the target media content may be displayed on the live streaming news page, so that the first user views details of the live streaming preview by triggering the view entry 311.

For example, after the target media content is published, a publish success notification may also be displayed on a current page, and the first user can view the details of the live streaming preview by triggering the publish success notification. That is, optionally, after the target media content is published, the method further includes displaying a second notification, entering a media content display page in response to a triggering operation of the first user for the second notification, and displaying the target media content on the media content display page.

Step 209: Add the target media content to a list of works of the user to whom the target live streaming channel belongs.

For example, after the target media content is published, the target media content is added to the list of works of the user to whom the target live streaming channel belongs, so that the second user views the target media content through the list of works, and the target media content may also be pushed to the second user in the form of a work, helping the second user to learn live streaming content in advance.

Figure 4:
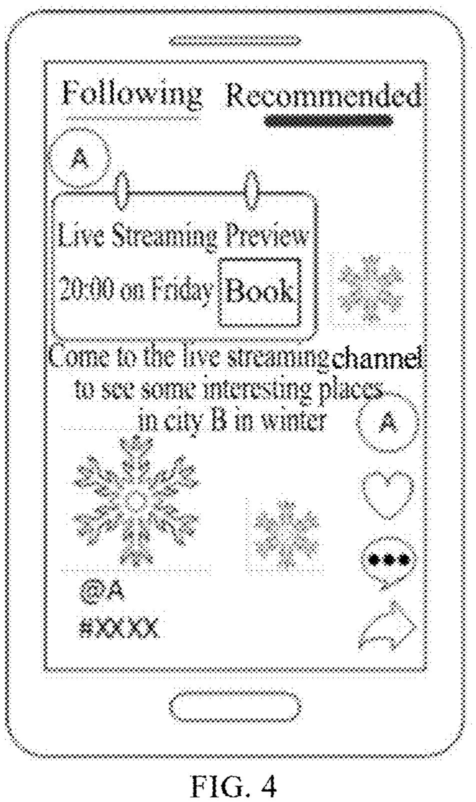
FIG. 4 is a schematic diagram of an interface according to an embodiment of the present disclosure.

FIG. 4 is a schematic diagram of an interface according to an embodiment of the present disclosure. As shown in FIG. 4, the target media content is pushed to the second user in the form of a video work. The second user can see the target media content while browsing a video stream, and can book the target live streaming event by triggering the preset control if they are interested in the target media content.

In the media content generation method according to this embodiment of the present disclosure, the initial text information input by the first user for the target live streaming channel is obtained, and the information associated with the target live streaming event in the target live streaming channel is extracted from the initial text information; after the generation operation of the first user is received, the initial text information is added to the target page for viewing by the second user; the preset media template is automatically filled with the information associated with the target live streaming event, to generate the initial media content; and the target media content is determined based on the edit operation of the first user, published, and added to the list of works. With the above technical solution, the first user can synchronize automatic generation of related live streaming preview content after editing the live streaming announcement in the form of text, and the first user is supported to perform editing according to their own will, to quickly obtain the target media content that satisfies a demand of the first user, which is then pushed to the second user through the server, reducing operations to be performed by the first user, enriching forms of the live streaming preview, ensuring the efficiency of generating and publishing the live streaming preview, and improving the effect of the live streaming preview.

Figure 5:
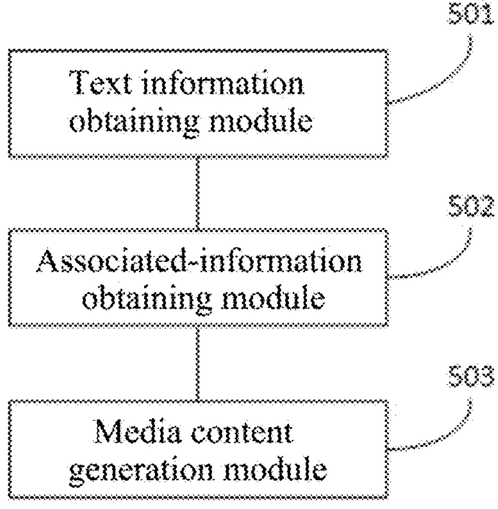
FIG. 5 is a schematic diagram of a structure of a media content generation apparatus according to an embodiment of the present disclosure.

FIG. 5 is a schematic diagram of a structure of a media content generation apparatus according to an embodiment of the present disclosure. As shown in FIG. 5, the apparatus includes: a text information obtaining module 501, an associated-information obtaining module 502, and a media content generation module 503.

The text information obtaining module 501 is configured to obtain initial text information input by a first user for a target live streaming channel. The associated-information obtaining module 502 is configured to obtain information associated with a target live streaming event in the target live streaming channel based on the initial text information. The media content generation module 503 is configured to generate target media content based on the information associated with the target live streaming event in response to a preset operation of the first user, where the target media content includes image content and/or video content related to the information associated with the target live streaming event.

In the media content generation apparatus according to this embodiment of the present disclosure, the initial text information input by the first user for the target live streaming channel is obtained, the information associated with the target live streaming event in the target live streaming channel is obtained based on the initial text information, and the target media content is generated based on the information associated with the target live streaming event in response to the preset operation of the first user, where the target media content includes the image content and/or the video content related to the information associated with the target live streaming event. With the above technical solution, the first user can input information related to the live streaming event in the target live streaming channel in the form of text, and is automatically assisted in generating the target media content corresponding to the initial text information, reducing operations to be performed by the first user, enriching forms of the live streaming preview, and ensuring efficiency of generating the live streaming preview.

Optionally, the information associated with the target live streaming event includes target live streaming topic information and/or target live streaming time information of the target live streaming event.

Optionally, the associated-information obtaining module 502 is configured to: determine initial time information based on the initial text information; if the initial time information includes one piece of live streaming time information, determine the live streaming time information as the target live streaming time information of the target live streaming event in the target live streaming channel; and if the initial time information includes a plurality of pieces of live streaming time information, determine, as the target live streaming time information, live streaming time information in the plurality of pieces of live streaming time information that satisfies a preset condition.

Optionally, the target media content includes at least one piece of the following: information associated with a user to whom the target live streaming channel belongs; target live streaming topic information contained in the associated information; target live streaming time information contained in the information associated with the target live streaming event; a background image associated with the target live streaming event and/or the user to whom the target live streaming channel belongs; audio associated with the target live streaming event and/or the user to whom the target live streaming channel belongs; and a preset control, where the preset control is used for a second user to trigger an interaction operation associated with a target object, and the target object includes at least one of the target live streaming event, the target live streaming channel, and the user to whom the target live streaming channel belongs.

Optionally, the media content generation module 503 is configured to: generate and publish the target media content based on the information associated with the target live streaming event in response to a first publish operation input by the first user.

Optionally, the media content generation module 503 includes: a generation unit configured to generate the target media content based on the information associated with the target live streaming event in response to a generation operation input by the first user; and a publish unit configured to publish the target media content in response to a second publish operation of the first user for the target media content.

Optionally, the generation unit includes: a first generation sub-unit configured to generate initial media content based on the information associated with the target live streaming event in response to a first generation operation of the first user; and a second generation sub-unit configured to generate the initial media content as the target media content.

Optionally, the generation unit includes: a third generation sub-unit configured to generate initial media content based on the information associated with the target live streaming event in response to a second generation operation of the first user. The third generation sub-unit is configured to edit the initial media content in response to an edit operation input by the first user for the initial media content, to obtain an edit result, and generate the target media content based on the edit result.

Optionally, the apparatus further includes: an adding module configured to add the target media content to a target page in response to a publish operation input by the first user, where the target page is associated with a user to whom the target live streaming channel belongs, the target page is used for viewing by a second user, and the publish operation includes the first publish operation or the second publish operation.

Optionally, the adding the target media content to a target page includes: adding the target media content to a list of works of the user to whom the target live streaming channel belongs.

Optionally, the generating target media content based on the information associated with the target live streaming event includes: filling a preset media template with the information associated with the target live streaming event, to obtain a filling result, and generating the target media content based on the filling result.

Optionally, the generating initial media content based on the information associated with the target live streaming event includes: generating an editable element based on the information associated with the target live streaming event; and generating the initial media content based on the editable element.

The media content generation apparatus provided in this embodiment of the present disclosure can perform the media content generation method provided in any of the embodiments of the present disclosure, and has corresponding functional modules and effects for performing the method.

It is worth noting that the plurality of units and modules included in the above apparatus are obtained through division merely according to functional logic, but are not limited to the above division, as long as corresponding functions can be implemented. In addition, the specific name of each functional unit is merely used for mutual distinguishing, and is not intended to limit the protection scope of the embodiments of the present disclosure.

Figure 6:
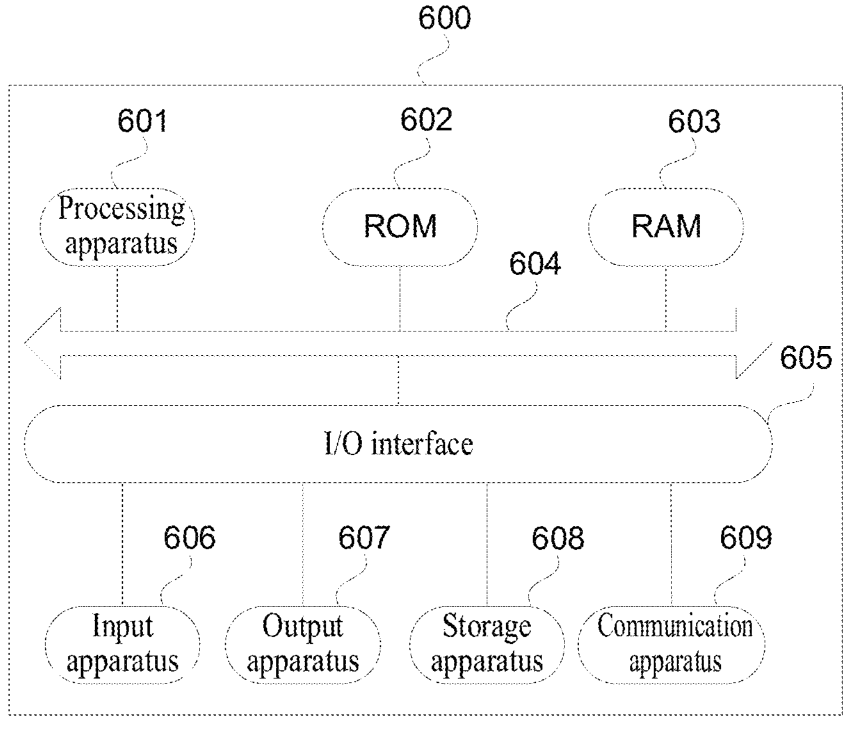
FIG. 6 is a schematic diagram of a structure of an electronic device according to an embodiment of the present disclosure.

FIG. 6 is a schematic diagram of a structure of an electronic device according to an embodiment of the present disclosure. Reference is made to FIG. 6 below. FIG. 6 is a schematic diagram of a structure of an electronic device (such as a terminal device or a server in FIG. 6) 600 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital television (TV) and a desktop computer. The electronic device shown in FIG. 6 is merely an example, and shall not impose any limitation on the function and scope of use of the embodiments of the present disclosure.

As shown in FIG. 6, the electronic device 600 may include a processing apparatus (e.g., a central processor, a graphics processor) 601. The electronic device 600 may perform various appropriate actions and processing in accordance with a program stored in a read-only memory (ROM) 602 or a program loaded from a storage apparatus 608 into a random access memory (RAM) 603. The RAM 603 further stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touchscreen, a touchpad, a keyboard, a mouse, a camera, a microphone, an accelerometer, and a gyroscope; an output apparatus 607 including, for example, a liquid crystal display (LCD), a speaker, and a vibrator; the storage apparatus 608 including, for example, a tape and a hard disk; and a communication apparatus 609. The communication apparatus 609 may allow the electronic device 600 to perform wireless or wired communication with other devices to exchange data. Although FIG. 6 shows the electronic device 600 having multiple apparatuses, it should be understood that it is not required to implement or have all of the shown apparatuses. It may be an alternative to implement or have more or fewer apparatuses.

According to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 609 and installed, installed from the storage apparatus 608, or installed from the ROM 602. When the computer program is executed by the processing apparatus 601, the above-mentioned functions defined in the method of the embodiment of the present disclosure are performed.

The names of messages or information exchanged between a plurality of apparatuses in the implementations of the present disclosure are used for illustrative purposes only, and are not used to limit the scope of these messages or information.

The electronic device provided in this embodiment of the present disclosure and the media content generation methods provided in the above embodiments belong to the same inventive concept. For the technical details not described in detail in this embodiment, reference can be made to the above embodiment, and this embodiment and the above embodiment have the same effects.

This embodiment of the present disclosure provides a computer storage medium having stored thereon a computer program that, when executed by a processor, causes the media content generation methods provided in the above embodiments to be implemented.

The above computer-readable medium described in the present disclosure may be a computer-readable signal medium, or a computer-readable storage medium, or any combination thereof. The computer-readable storage medium may be, for example, but is not limited to, electric, magnetic, optical, electromagnetic, or infrared, and may include, but is not limited to: an electrical connection having one or more wires, a portable computer magnetic disk, a hard disk, a RAM, a ROM, an electrically erasable programmable read-only memory (EPROM) or a flash memory, an optical fiber, a portable compact disc read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, and the computer-readable signal medium carries computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server can communicate using any currently known or future-developed network protocol such as a HyperText Transfer Protocol (HTTP), and may be connected to digital data communication (for example, communication network) in any form or medium. Examples of the communication network include a local area network (LAN), a wide area network (WAN), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: obtain initial text information input by a first user for a target live streaming channel;

obtain information associated with a target live streaming event in the target live streaming channel based on the initial text information; and generate target media content based on the information associated with the target live streaming event in response to a preset operation of the first user, where the target media content includes image content and/or video content related to the information associated with the target live streaming event.

The computer program code for performing the operations of the present disclosure may be written in one or more programming languages, where the programming languages include, but are not limited to, an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including LAN or WAN, or may be connected to an external computer (for example, connected over the Internet using an Internet service provider).

The flowcharts and block diagrams in the accompanying drawings illustrate the possibly implemented architecture, functions, and operations of the system, method, and computer program product according to multiple embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. The name of a module does not constitute a limitation on the module itself in some cases. For example, the text information obtaining module may also be described as "a module for obtaining initial text information input by a first user for a target live streaming channel".

The functions described herein above may be performed at least partially by one or more hardware logic components. For example, without limitation, exemplary types of hardware logic components that may be used include: a field-programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. The machine-readable storage medium may include an electrical connection based on one or more wires, a portable computer disk, a hard disk, a RAM, a ROM, an EPROM, a flash memory, an optic fiber, a CD-ROM, an optical storage device, a magnetic storage device, or any suitable combination thereof.

According to one or more embodiments of the present disclosure, a media content generation method is provided. The method includes: obtaining initial text information input by a first user for a target live streaming channel; obtaining information associated with a target live streaming event in the target live streaming channel based on the initial text information; and generating target media content based on the information associated with the target live streaming event in response to a preset operation of the first user, where the target media content includes image content and/or video content related to the information associated with the target live streaming event.

According to one or more embodiments of the present disclosure, the information associated with the target live streaming event includes target live streaming topic information and/or target live streaming time information of the target live streaming event.

According to one or more embodiments of the present disclosure, the obtaining information associated with a target live streaming event in the target live streaming channel based on the initial text information includes: determining initial time information based on the initial text information; if the initial time information includes one piece of live streaming time information, determining the live streaming time information as the target live streaming time information of the target live streaming event in the target live streaming channel; and if the initial time information includes a plurality of pieces of live streaming time information, determining, as the target live streaming time information, live streaming time information in the plurality of pieces of live streaming time information that satisfies a preset condition.

According to one or more embodiments of the present disclosure, the target media content includes at least one piece of the following: information associated with a user to whom the target live streaming channel belongs; target live streaming topic information contained in the information associated with the target live streaming event; target live streaming time information contained in the information associated with the target live streaming event; a background image associated with the target live streaming event and/or the user to whom the target live streaming channel belongs; audio associated with the target live streaming event and/or the user to whom the target live streaming channel belongs; and a preset control, where the preset control is configured for a second user to trigger an interaction operation associated with a target object, and the target object includes at least one of the target live streaming event, the target live streaming channel, and the user to whom the target live streaming channel belongs.

According to one or more embodiments of the present disclosure, the generating target media content based on the information associated with the target live streaming event in response to a preset operation of the first user includes: generating and publishing the target media content based on the information associated with the target live streaming event in response to a first publish operation input by the first user.

According to one or more embodiments of the present disclosure, the generating target media content based on the information associated with the target live streaming event in response to a preset operation of the first user includes: generating the target media content based on the information associated with the target live streaming event in response to a generation operation input by the first user; and publishing the target media content in response to a second publish operation of the first user for the target media content.

According to one or more embodiments of the present disclosure, the generating the target media content based on the information associated with the target live streaming event in response to a generation operation input by the first user includes: generating initial media content based on the information associated with the target live streaming event in response to a first generation operation of the first user; and generating the initial media content as the target media content.

According to one or more embodiments of the present disclosure, the generating the target media content based on the information associated with the target live streaming event in response to a generation operation input by the first user includes: generating initial media content based on the information associated with the target live streaming event in response to a second generation operation of the first user; and editing the initial media content in response to an edit operation input by the first user for the initial media content, to obtain an edit result, and generating the target media content based on the edit result.

According to one or more embodiments of the present disclosure, the method further includes: adding the target media content to a target page in response to a publish operation input by the first user, where the target page is associated with a user to whom the target live streaming channel belongs, the target page is used for viewing by a second user, and the publish operation includes the first publish operation or the second publish operation.

According to one or more embodiments of the present disclosure, the adding the target media content to a target page includes: adding the target media content to a list of works of the user to whom the target live streaming channel belongs.

According to one or more embodiments of the present disclosure, the generating target media content based on the information associated with the target live streaming event includes: filling a preset media template with the information associated with the target live streaming event, to obtain a filling result, and generating the target media content based on the filling result.

According to one or more embodiments of the present disclosure, the generating initial media content based on the information associated with the target live streaming event includes: generating an editable element based on the information associated with the target live streaming event; and generating the initial media content based on the editable element.

According to one or more embodiments of the present disclosure, a media content generation apparatus is provided. The apparatus includes: a text information obtaining module configured to obtain initial text information input by a first user for a target live streaming channel; an associated-information obtaining module configured to obtain information associated with a target live streaming event in the target live streaming channel based on the initial text information; and a media content generation module configured to generate target media content based on the information associated with the target live streaming event in response to a preset operation of the first user, where the target media content includes image content and/or video content related to the information associated with the target live streaming event.

According to one or more embodiments of the present disclosure, an electronic device is provided. The electronic device includes: one or more processors; and a storage apparatus configured to store one or more programs, where the one or more programs, when executed by the one or more processors, cause the one or more processors to implement the media content generation method according to the embodiment of the present disclosure.

According to one or more embodiments of the present disclosure, a storage medium including computer-executable instructions is provided, where the computer-executable instructions, when executed by a computer processor, are used to perform the media content generation method according to the embodiment of the present disclosure.

I claim:

1. A media content generation method, comprising:

obtaining initial text information input by a first user for a target live streaming channel;

obtaining information associated with a target live streaming event in the target live streaming channel based on the initial text information, wherein the information associated with the target live streaming event comprises at least one piece of target live streaming topic information of the target live streaming event and target live streaming time information of the target live streaming event; and generating target media content based on the information associated with the target live streaming event in response to a preset operation of the first user, wherein the target media content comprises at least one of image content and video content related to the information associated with the target live streaming event.

2. The method according to claim 1, wherein the obtaining information associated with the target live streaming event in the target live streaming channel based on the initial text information comprises:

determining initial time information based on the initial text information;

if the initial time information comprises one piece of live streaming time information, determining the live streaming time information as the target live streaming time information of the target live streaming event in the target live streaming channel; and if the initial time information comprises a plurality of pieces of live streaming time information, determining, as the target live streaming time information, live streaming time information in the plurality of pieces of live streaming time information that satisfies a preset condition.

3. The method according to claim 1, wherein the target media content comprises at least one piece of the following:

information associated with a user to whom the target live streaming channel belongs; the target live streaming topic information contained in the information associated with the target live streaming event; the target live streaming time information contained in the information associated with the target live streaming event; a background image associated with at least one of the target live streaming event and the user to whom the target live streaming channel belongs; audio associated with at least one of the target live streaming event and the user to whom the target live streaming channel belongs; and a preset control, wherein the preset control is used for a second user to trigger an interaction operation associated with a target object, and the target object comprises at least one of the target live streaming event, the target live streaming channel, and the user to whom the target live streaming channel belongs.

4. The method according to claim 1, wherein the generating target media content based on the information associated with the target live streaming event in response to the preset operation of the first user comprises:

generating and publishing the target media content based on the information associated with the target live streaming event in response to a first publish operation input by the first user.

5. The method according to claim 1, wherein the generating target media content based on the information associated with the target live streaming event in response to the preset operation of the first user comprises:

generating the target media content based on the information associated with the target live streaming event in response to a generation operation input by the first user; and publishing the target media content in response to a second publish operation of the first user for the target media content.

6. The method according to claim 5, wherein the generating the target media content based on the information associated with the target live streaming event in response to the generation operation input by the first user comprises:

generating initial media content based on the information associated with the target live streaming event in response to a first generation operation of the first user; and generating the initial media content as the target media content.

7. The method according to claim 5, wherein the generating the target media content based on the information associated with the target live streaming event in response to the generation operation input by the first user comprises:

generating initial media content based on the information associated with the target live streaming event in response to a second generation operation of the first user; and editing the initial media content in response to an edit operation input by the first user for the initial media content, to obtain an edit result, and generating the target media content based on the edit result.

8. The method according to claim 4, further comprising:

adding the target media content to a target page in response to a publish operation input by the first user, wherein the target page is associated with a user to whom the target live streaming channel belongs, the target page is used for viewing by a second user, and the publish operation comprises the first publish operation or the second publish operation.

9. The method according to claim 8, wherein the adding the target media content to the target page comprises:

adding the target media content to a list of works of the user to whom the target live streaming channel belongs.

10. The method according to claim 1, wherein the generating target media content based on the information associated with the target live streaming event comprises:

filling a preset media template with the information associated with the target live streaming event, to obtain a filling result, and generating the target media content based on the filling result.

11. The method according to claim 6, wherein the generating initial media content based on the information associated with the target live streaming event comprises:

generating an editable element based on the information associated with the target live streaming event; and generating the initial media content based on the editable element.

12. An electronic device, comprising:

at least one processor; and a storage apparatus configured to store at least one program, wherein the at least one program, when executed by the at least one processor, causes the at least one processor to implement a media content generation method comprising:

obtaining initial text information input by a first user for a target live streaming channel;

obtaining information associated with a target live streaming event in the target live streaming channel based on the initial text information, wherein the information associated with the target live streaming event comprises at least one piece of target live streaming topic information of the target live streaming event and target live streaming time information of the target live streaming event; and generating target media content based on the information associated with the target live streaming event in response to a preset operation of the first user, wherein the target media content comprises at least one of image content and video content related to the information associated with the target live streaming event.

13. A non-transitory storage medium comprising computer- executable instructions that, when executed by a computer processor, are used to perform a media content generation method comprising:

obtaining initial text information input by a first user for a target live streaming channel;

obtaining information associated with a target live streaming event in the target live streaming channel based on the initial text information, wherein the information associated with the target live streaming event comprises at least one piece of target live streaming topic information of the target live streaming event and target live streaming time information of the target live streaming event; and generating target media content based on the information associated with the target live streaming event in response to a preset operation of the first user, wherein the target media content comprises at least one of image content and video content related to the information associated with the target live streaming event.

14. The electronic device according to claim 12, wherein the obtaining information associated with the target live streaming event in the target live streaming channel based on the initial text information comprises:

determining initial time information based on the initial text information;

if the initial time information comprises one piece of live streaming time information, determining the live streaming time information as the target live streaming time information of the target live streaming event in the target live streaming channel; and if the initial time information comprises a plurality of pieces of live streaming time information, determining, as the target live streaming time information, live streaming time information in the plurality of pieces of live streaming time information that satisfies a preset condition.

15. The electronic device according to claim 12, wherein the target media content comprises at least one piece of the following:

information associated with a user to whom the target live streaming channel belongs; the target live streaming topic information contained in the information associated with the target live streaming event; the target live streaming time information contained in the information associated with the target live streaming event; a background image associated with at least one of the target live streaming event and the user to whom the target live streaming channel belongs; audio associated with at least one of the target live streaming event and the user to whom the target live streaming channel belongs; and a preset control, wherein the preset control is used for a second user to trigger an interaction operation associated with a target object, and the target object comprises at least one of the target live streaming event, the target live streaming channel, and the user to whom the target live streaming channel belongs.

16. The electronic device according to claim 12, wherein the generating target media content based on the information associated with the target live streaming event in response to the preset operation of the first user comprises:

generating and publishing the target media content based on the information associated with the target live streaming event in response to a first publish operation input by the first user.

17. The electronic device according to claim 12, wherein the generating target media content based on the information associated with the target live streaming event in response to a preset operation of the first user comprises:

generating the target media content based on the information associated with the target live streaming event in response to a generation operation input by the first user; and publishing the target media content in response to a second publish operation of the first user for the target media content.

18. The electronic device according to claim 17, wherein the generating the target media content based on the information associated with the target live streaming event in response to the generation operation input by the first user comprises:

generating initial media content based on the information associated with the target live streaming event in response to a first generation operation of the first user; and generating the initial media content as the target media content.

* * * * *